April 21, 1964  D. C. ORCUTT ETAL  3,129,797
SELECTIVE DRIVE TRANSMISSION
Filed Feb. 9, 1962  2 Sheets-Sheet 1

INVENTORS:
DALE C. ORCUTT
CLAUD J. DRY
BY
Mellin and Hanscom
ATTORNEYS

April 21, 1964   D. C. ORCUTT ETAL   3,129,797
SELECTIVE DRIVE TRANSMISSION
Filed Feb. 9, 1962   2 Sheets-Sheet 2

INVENTORS:
DALE C. ORCUTT
CLAUD J. DRY
BY Meelin and Hanscom
ATTORNEYS

United States Patent Office 3,129,797
Patented Apr. 21, 1964

3,129,797
SELECTIVE DRIVE TRANSMISSION
Dale C. Orcutt, 291 E. State St., and Claud J. Dry,
76 S. Shannon Ave., both of Athens, Ohio
Filed Feb. 9, 1962, Ser. No. 172,189
6 Claims. (Cl. 192—48)

This invention relates to clutching devices and more particularly involves a selective drive transmission for rotating a driven shaft by one of two pulleys mounted thereon.

In brief, this invention comprises a set of three clutch plates coaxially supported upon a driven shaft member, each of said clutch plates being arranged in axially spaced relationship and keyed to the shaft member for simultaneous rotation therewith. The intermediate one of the three clutch plates is also secured against axial movement, but the outer plates are movable axially of the shaft. It will be evident, therefore, that the outer plates may be moved axially toward or away from the intermediate clutch plate. A pair of first and second pulleys are also provided, each pulley having clutching discs on both of its sides. The pulleys are freely mounted upon the driven shaft, being respectively interdigitated with the intermediate clutch plate and an outer plate, and the clutching discs of each pulley are matable with adjacent surfaces of the clutch plates on either side.

The invention further comprises a means for simultaneously moving both of the outer clutch plates axially of the driven shaft, thereby selectively placing one of said plates into engagement with its adjacent pulley clutching disc, the associated pulley being moved against the intermediate clutch plate. Inasmuch as the opposite one of said outer clutch plates is moved away from the intermediate plate while the one plate is moved toward the intermediate plate, one of the pulleys is being "clutched" to the drive shaft while the other pulley is "unclutched." This clutching transmission is especially useful in connection with variable drive systems requiring frequent changes between low-speed and high-speed drives and the transmission insures that only one clutching connection can be made at a time, irrespective of normal wear between clutching discs. Moreover, the particular construction and arrangement of parts as hereinafter described may be produced at relatively low costs.

Thus, a principal object of this invention is to provide a selective drive transmission which is simple to operate; a transmission which may be operated either by manual shifting or automatic centrifugal clutch mechanisms; a transmission which is sensitive but durable and may yet be manufactured at a relatively low cost.

Another object is to provide a selective drive mechanism of the kind described and more particularly wherein the means for simultaneously moving the outer clutch plates comprises a spring member urging one of said outer clutch plates into engagement with its associated pulley clutching disc, manually operable means for exerting a thrust against the other one of said outer clutch plates and moving it into engagement with its associated pulley clutching disc, and means extending between said outer clutch plates for maintaining them a fixed distance apart and permitting an engagement between only one outer clutch plate and its associated pulley clutching disc.

A further object is to provide a selective drive mechanism of the kind described and more particularly wherein the intermediate clutch plate includes sleeve portions extending axially on either side and further wherein the pulleys are rotatably supported by respective sleeve portions.

And yet another object is to provide a selective drive mechanism of the kind described wherein the outer clutch plates are maintained a fixed distance apart by spacer pin members.

Other objects of this invention will become apparent in view of the drawings and the following detailed description.

In the drawings forming a part of this application, and in which like parts are designated by like reference numerals throughout the same, FIG. 1 is, essentially, a longitudinal section of a preferred embodiment of a selective drive transmission, constructed in a manner contemplated by this invention;

Figure 1:
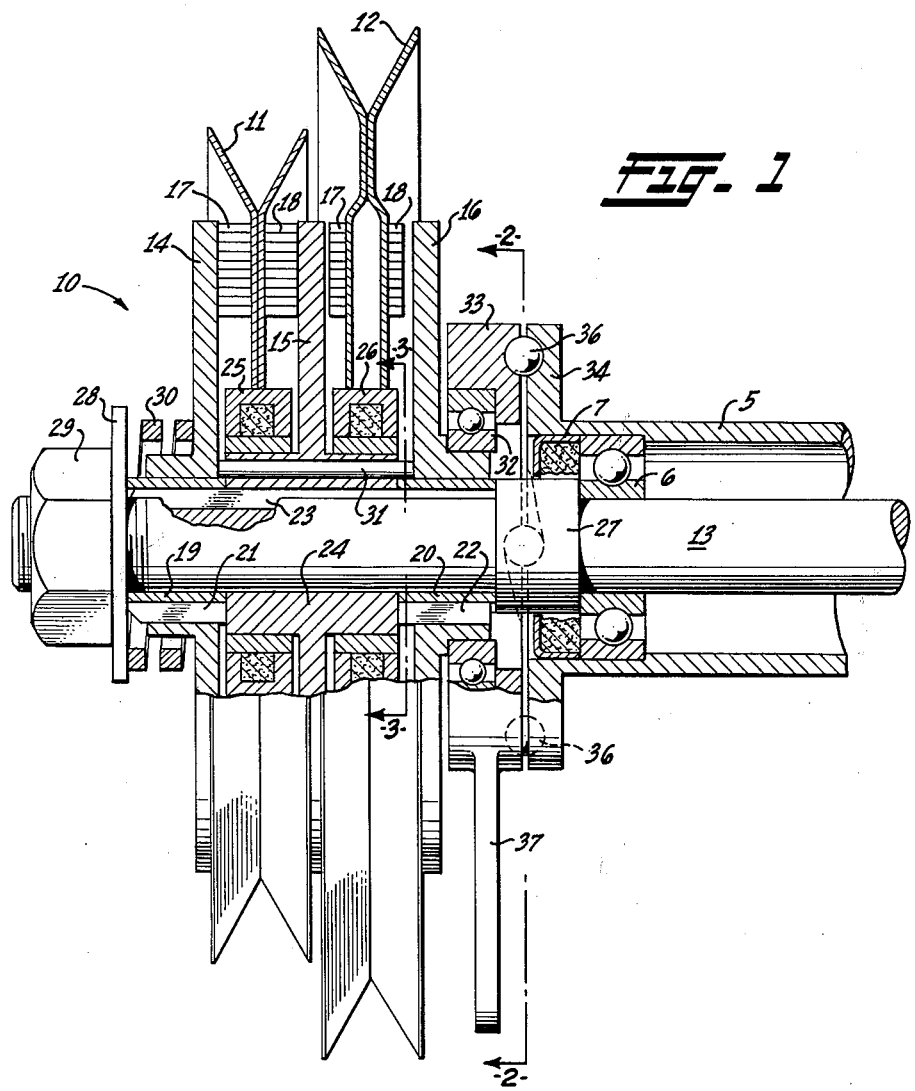

Referring to FIG. 1, there is shown a selective drive transmission 10 including a first pulley 11, and a second pulley 12, both of said pulleys being freely rotatable relative to a driven shaft 13 except when coupled thereto by clutching means comprising three clutch plates 14, 15 and 16. These clutch plates are coaxially supported upon the driven shaft 13, each plate being arranged in axially spaced relationship and keyed to the shaft member for simultaneous rotation therewith. Pulleys 11 and 12, it will be noted, are disposed in an interdigitated fashion with the clutch plates, and each pulley is provided with clutching discs 17 and 18 on opposite sides, said discs being engageable with adjacent surfaces of the clutch plates.

Shaft 13 is supported in a conventional manner within an axle housing 5 having an inner roller bearing 6 and a dust seal 7.

The clutching plates and pulleys are mounted in the following manner: Outer clutch plates 14 and 16 are keyed to a pair of key sleeves 19 and 20, respectively, each sleeve having one or more splines 21 and 22, respectively, which allow the plates to be moved in directions axially relative to the shaft. Key sleeves 19 and 20 are in turn keyed to shaft 13 by a spline connection 23 which also connects a hub 24 of intermediate clutch plate 15 with the shaft. Hub portion 24 includes sleeve portions extending on either side of plate 15 upon which the pulleys 11 and 12 are respectively supported for both rotative and axial movements. Conventional oil wick bearings 25 and 26 are provided for pulleys 11 and 12, respectively.

Key sleeves 19 and 20, together with clutch plate 15, are confined between a collar 27 on shaft 13 and a washer plate 28 by a nut 29. Thus, while the outer clutch plates 14 and 16 may be moved axially relative to shaft 13, intermediate clutch plate 15 is secured against any axial movement.

A coil spring 30 disposed intermediate washer 28 and clutch plate 14 normally forces plate 14 into engagement with the clutching discs 17 of pulley 11. Since pulley 11 is freely rotatably and axially movable on one of the sleeve extensions of hub 24, the pulley together with clutch plate 14 are then moved toward intermediate clutch plate 15 until clutching discs 18 of pulley 11 are placed into contact with said intermediate clutch plate, thereby clutching the pulley to shaft 13 through spline connections 23 and 21.

Hub portion 24, it will be noted, is provided with angularly spaced holes formed parallel with the axis of shaft 13; and a set of pin members 31 extends through the holes with a slidable fit. Each of the pin members engages clutch plate 14 at one end and clutch plate 16 at the other end, thereby providing means for maintaining these outer clutch plates a fixed distance apart. Moreover, it will be evident that if clutch plate 14 is moved into a clutching position by spring 30, as shown, then clutch plate 16 will necessarily be held away from the clutching discs 18 of pulley 12, allowing said pulley to be rotated and moved axially relative to shaft 13 against a thrust bearing 32 mounted in a disc housing 33.

Figure 2:
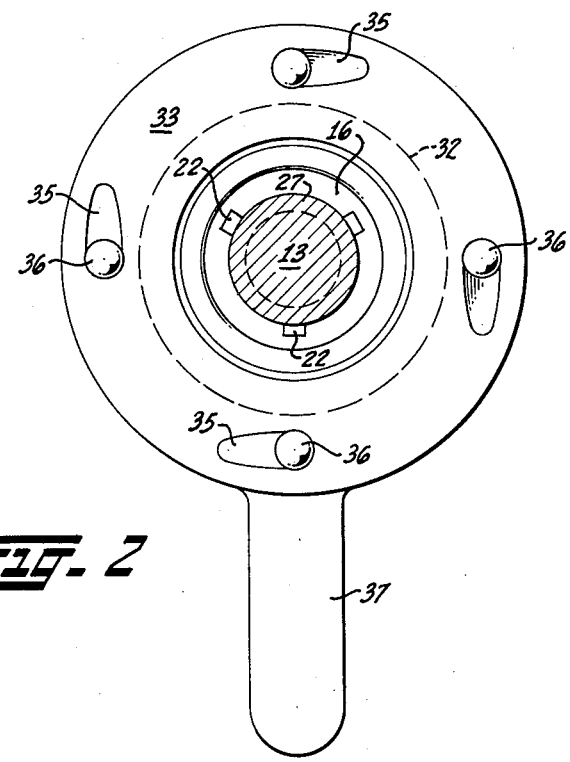
FIG. 2 is a transverse section taken on lines 2—2 of FIG. 1.
Figure 3:
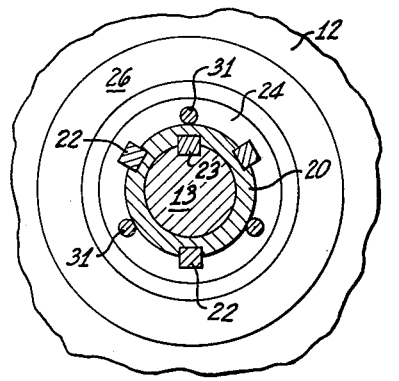
FIG. 3 is a transverse section taken on lines 3—3 of FIG. 1.

The axial biasing force of spring 30, transmitted to housing 33 through clutch plate 14, pins 31, clutch plate 16 and thrust bearing 32, tends to move said housing toward a flange plate 34 mounted at the end of housing 5. The adjacent plate surfaces of housing 33 and plate 34 are provided with axially inclined and complementary ball grooves 35, such as shown in FIGS. 1 and 2, each groove having a ball 36 disposed therein. When the ball grooves of housing 33 and plate 34 are aligned with the deepest portion of each groove opposite the deepest portion of its complementary groove, and with the balls 36 disposed in the pocket formed between (see FIG. 1), housing 33 is then held in a position where clutch plate 16 is moved away from clutching discs 18 of pulley 12. It will be evident, however, that by manually rotating the control handle 37 on housing 33 so as to force the balls 36 to roll up the inclined surface of complementary grooves 35, the housing 33 will be moved against the biasing force of spring 30. This, of course, will move disc 16 into engagement with clutching discs 18 of pulley 12 forcing the discs 17 of pulley 12 into contact with intermediate disc 15. Simultaneous with such movement, pin members 31 will move clutch disc 14 away from the clutching discs 17 of pulley 11, thereby allowing said pulley to idle upon hub portion 24.

It will be evident that the selective drive transmission as shown and described can be effectively controlled by operation of handle 37 so as to clutch either pulley 11 or pulley 12 to driven shaft 13. Moreover, the clutching or unclutching of one pulley will necessarily produce an opposite effect upon the other. In addition, it should be realized that such a transmission device might be used to declutch both pulleys simultaneously, thereby providing a neutral position of operation; and although the device described is intended to be manually operated, it is equally possible to adapt a conventional type centrifugal clutch to rotate the housing 33 relative to flange plate 34.

As the clutching discs 17 and 18 of each pulley become worn, the distance of axial movement required to effect a clutching and unclutching operation becomes greater. Consequently, the range for "neutral" positioning may be enlarged. In certain instances or under some conditions of operation it may be desirable to reduce the range of "neutral" play. This may be done simply by replacing the pin members 31 with shorter pins. Alternatively, the transmission may initially be constructed with outer clutch plates having recessed hub surfaces aligned with the pin members. Shim members could then be provided in those recessed surfaces and as the clutch discs become worn, one or more shims could be removed, thus spacing the clutch plates closer together.

It is to be understood that the form of the invention herewith shown and described is to be taken as a preferred example thereof, and that various changes may be made in the shape, size and arrangement of certain parts without departing from the spirit of the invention or the scope of the attached claims, and each of such changes is contemplated.

Having thus described our invention, what we claim and desire to secure by Letters Patent is:

1. A selective drive mechanism comprising:
   (a) a rotatably mounted shaft;
   (b) first, second and third clutch plates coaxially mounted and keyed to said shaft in axially spaced relationship for simultaneous rotation with said shaft, the second clutch plate being intermediate the first and third clutch plates and secured against axial movement, the first and third clutch plates being movable axially of said shaft;
   (c) a first pulley coaxially mounted upon said shaft and intermediate said first and second clutch plates, a second pulley coaxially mounted upon said shaft and intermediate said second and third clutch plates, said first and second pulleys each being freely rotatable on said shaft and having clutching discs mounted on both sides thereof and matable with adjacent clutch plates;
   (d) means for simultaneously urging said first and third clutch plates in one axial direction, placing said first clutch plate into engagement with its associated first pulley clutching disc and placing the third clutch plate out of engagement with its associated second pulley clutching disc; and
   (e) manually operable means for moving said first and third clutch plates in the opposite axial direction, placing the third clutch plate into engagement with its associated second pulley clutching disc and placing the first clutch plate out of engagement with its associated first pulley clutching disc.

2. The selective drive mechanism of claim 1 wherein said first and second pulleys are supported by a sleeve portion of said second clutch plate.

3. The selective drive mechanism of claim 1 wherein said first and third clutch plates are maintained a fixed distance apart by pin members therebetween.

4. The selective drive mechanism of claim 1 wherein said first and second pulleys are supported by sleeve portions of said second clutch plate, and further including pin members extending slidably through said sleeve portions and the second clutch plate, said pin members being in contact with said first and third clutch plates.

5. The selective drive mechanism of claim 1 wherein said means for simultaneously urging said first and third clutch plates comprises a spring seated against said first clutch plate, and at least one pin member intermediate said first and third clutch plates.

6. The selective drive mechanism of claim 5 and further wherein said manually operable means for moving said first and third clutch plates in the opposite axial direction comprises a device for applying an axial thrust to said third clutch plate.

References Cited in the file of this patent

UNITED STATES PATENTS

| 1,147,377 | Corrall | July 20, 1915 |
| 1,705,032 | Short | Mar. 12, 1926 |
| 2,398,716 | Ojutkangas | Apr. 16, 1946 |
| 2,947,394 | Grover | Aug. 2, 1960 |

FOREIGN PATENTS

| 169,632 | Austria | Dec. 10, 1951 |